Jan. 6, 1931.  J. L. BECKER  1,788,045
ROAD MAINTAINER
Original Filed July 15, 1929
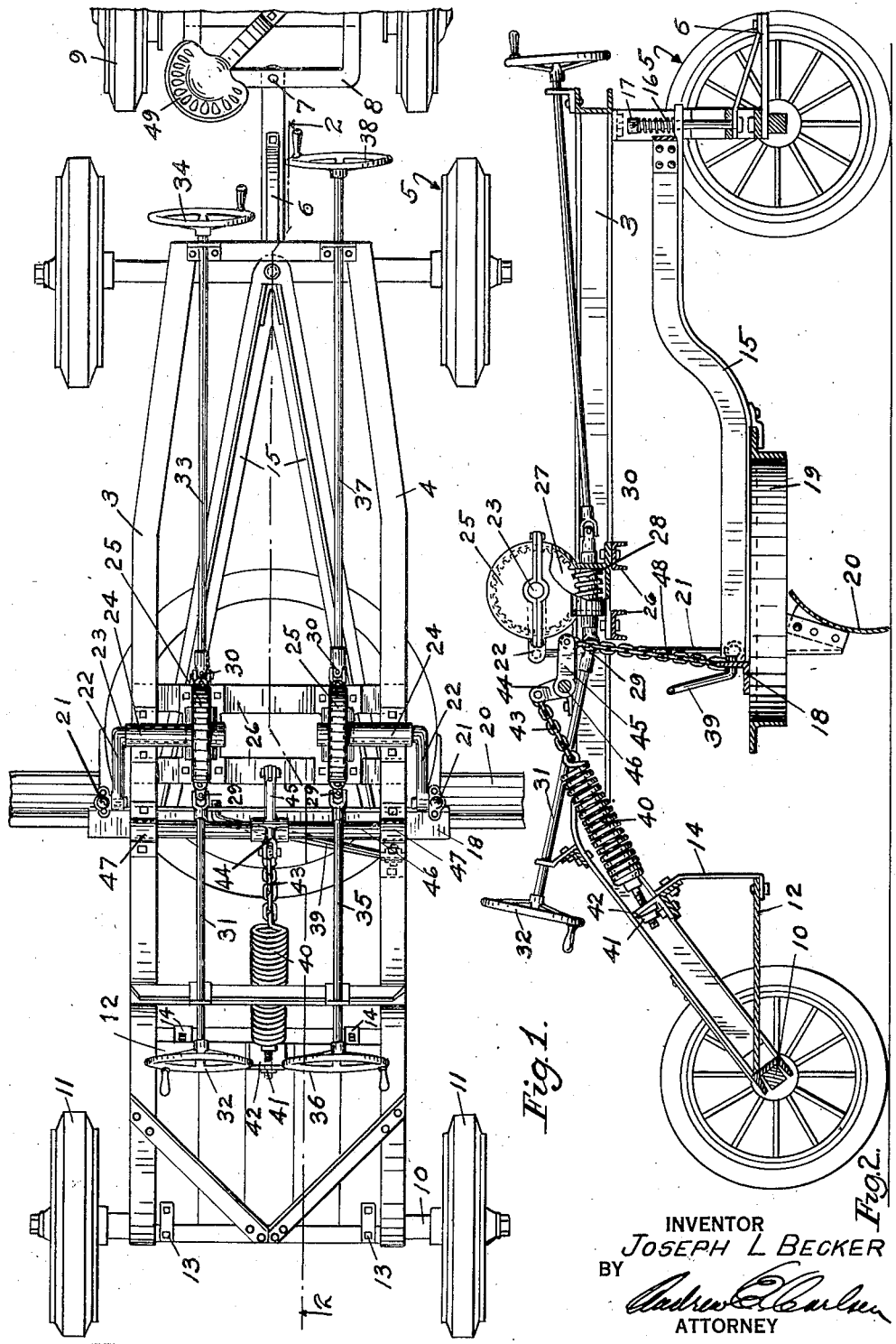
INVENTOR
JOSEPH L BECKER
BY
ATTORNEY Patented Jan. 6, 1931

1,788,045

UNITED STATES PATENT OFFICE

JOSEPH L. BECKER, OF STILLWATER, MINNESOTA

ROAD MAINTAINER

Application filed July 15, 1929, Serial No. 378,367. Renewed November 21, 1930.

This invention relates to road maintaining equipment and the primary object is to provide a road grader that is efficient and practical, and which is also simple in construction and economical to manufacture. A further object is to provide a grader in which the blade is subject to control from opposite ends of the machine, i. e., two sets of controls are connected with the blade adjusting mechanism, and one set extends to an operator's station at the rear of the machine, while the other set of controls extends forwardly to a point where they are within convenient reach of a tractor operator when the machine is hitched behind a tractor. The advantage of this double control system is no doubt obvious, as it permits the use of either one or two operators, depending upon how many are available for use, and it is unnecessary to make any alterations in the machine when it is to be used for either one or two man control.

In the accompanying drawings:

Fig. 1 is a plan view of the machine showing it as attached to the rear end of a tractor so as to be drawn thereby.

Fig. 2 is a sectional elevation of the grader as seen on the line 2—2 in Fig. 1, and with fractional portions broken away for purpose of illustration.

Referring to the drawings by reference characters, 3 and 4 designate the side beams of the main frame of a grader, the front end of which is supported by a truck 5 having a tongue 6 that may be secured, as at 7, to a drawbar 8 of a tractor 9. The rear ends of the beams 3 and 4 are supported on the axle 10 of a pair of ground wheels 11. Disposed between the rear ends of the beams 3 and 4 is an operator's station or platform 12 that is secured as by brackets 13 and 14. 15 designates a floating frame, the front end of which is attached, as at 16, to a bolster 17 at the front end of the main frame. The rear ends of the bars 15 are connected by a cross beam 18, and support what is commonly known as a circle 19, which in turn supports a scraper blade 20, and is usually made adjustable about a vertical axis so that the angle of the blade can be adjusted with respect to the line of draft. The rear end of the frame 15, together with the scraper blade, is raised and lowered and angularly adjusted in a transverse plane by a pair of depending links 21, the upper ends of which are attached to cranks 22 of a pair of short stub shafts 23. These shafts are journaled in bearings 24, and extend into housings 25 that are carried on a pair of cross bars 26, the ends of which are attached to the side bars of the main frame.

The housings 25 contain a pair of worm gears 27 that are respectively keyed to the shafts 23, and these worm gears mesh with a pair of worm screws 28 that are also disposed within the housings 25. These worm screws 28 are longitudinally disposed, and their front and rear ends project outside of the housings 25. The opposite ends of each of the worm screws 28 are connected by universal joints 29 and 30 to upwardly and rearwardly extending sets of controls. That is, the worm screw 28 at the left side of the machine is connected by its universal joint 29 to a control rod 31 having a hand wheel 32, while its universal joint 30 is connected by a control rod or shaft 33 to a hand wheel 34. The universal joint 29, at the right side of the machine, is connected by a shaft 35 to a hand wheel 36, while the right hand universal joint 30 is connected by a shaft 37 to a hand wheel 38. It may here be noted that the worm screws 28 are disposed below the worm gears 27, the object of this construction being to secure better lubrication to the worm screws, as the lubricant will naturally have a tendency to settle in the lower ends of the housings 25.

The cross bar 18 of the floating frame is connected to the main frame by a transversely arranged cross bar 39, the object of which is to retain the floating frame against transverse motion with respect to the main frame. In order that the floating or scraper frame may be transversely adjusted when desired, the vertical angle of the beam 18 may be provided with a series of perforations (not shown) so that the lower or left end of the bar 39 may be selectively secured at any desired point, with respect to the bar 18.

In order that the entire weight of the floating frame and scraper blade need not be carried by the adjusting mechanism I provide a counter-balancing spring 40, the rear end of which is adjustably secured, as at 41, to a cross bar 42, while its forward end is connected by a chain 43 to an upstanding arm 44 of a bell crank lever 44—45, which is in turn carried upon a shaft 46, the ends of which are journaled in bearings 47 on the main frame. The forwardly extending arm 45 of the bell crank lever is connected to a central point of the beam 18 by a chain 48. It will thus be seen that the spring 40, acting through the chains 43 and 48, and through the bell crank lever 44—45, serves to exert a lift to the rear end of the floating frame, and the tension of the spring is so adjusted that little effort is required to angularly or vertically adjust the grader blade.

It will be noted that the hand wheels 34 and 38 are offset, one with respect to the other, and that the seat 49 of the tractor 9 has been shifted to a sidewise position. This arrangement permits the tractor operator to sit in a partly turned position where he can not only operate the tractor but may also conveniently turn about to watch the action of the grader blade, and to operate the hand wheels 34 and 38. In the operation of the machine, if two operators are available, one of them will attend to the tractor controls while the other, standing upon the platform 12, will be in a position to observe the action of the grader blade, and to regulate it as may be required, by manipulating the hand wheels 32 and 36. This arrangement is of course conducive to better maintenance work, as each operator has fewer duties to perform. On the other hand, should only one operator be available, he can with a little experience soon learn to operate both the tractor and the grader, by sitting on the seat 49 and operating the hand wheels 34 and 38 to regulate the position of the blade as conditions may require. Should the second operator be available from time to time it is not necessary to make any adjustments in the machine, or to rearrange any of the parts, as the front and rear controls are always available and ready for immediate use.

It is understood that suitable modifications may be made in the structure as disclosed, provided such modifications come within the spirit and scope of the appended claims.

Having now therefore fully illustrated and described my invention what I claim to be new and desire to protect by Letters Patent is:

1. A road grader comprising a wheel supported main frame pivotally connected to so as to trail behind a tractor having a driver's support at its rear, a blade supporting grader frame adjustably disposed under the main frame, an operator's station at the rear of the main frame, a pair of worm wheels carried by the main frame and having cranks adjustably supporting the grader frame, worm screws meshing with the worm wheels, and two sets of control shafts extending longitudinally from the worm screws to opposite ends of the main frame, whereby one set of shafts may be controlled from the operator's station at the rear of the main frame and the other set of shafts may be controlled by an operator stationed on the driver's support of the tractor.

2. A road grader comprising a wheel supported main frame pivotally connected to so as to trail behind a tractor, a blade supporting grader frame adjustably disposed under the main frame, an operator's station at the rear of the main frame, a driver's support on the tractor, a pair of worm wheels carried by the main frame and having cranks adjustably supporting the grader frame, worm screws meshing with the worm wheels, and two sets of control shafts extending longitudinally from the worm screws to opposite ends of the main frame, whereby one set of shafts may be controlled from the operator's station at the rear of the main frame and the other set of shafts may be controlled by an operator stationed on the driver's support of the tractor, both of said sets of shafts being connected to the worm screws by universal joints.

3. A road grader comprising a wheel supported main frame adapted to be hitched to so as to trail behind a tractor, a blade supporting grader frame adjustably disposed under the main frame, an operator's station at the rear of the main frame, a pair of worm wheels carried by the main frame and having cranks adjustably supporting the grader frame, worm screws meshing with the worm wheels, and two sets of control shafts extending longitudinally from the worm screws to opposite ends of the main frame, whereby one set of shafts may be controlled from the operator's station at the rear of the main frame and the other set of shafts are disposed within reach of and may be controlled by an operator stationed on the tractor, said worm wheels and screws being disposed in housings carried on cross bars connecting side rails of the main frame.

4. In a machine of the character described, the combination with a tractor having a rearwardly disposed driver's support, a wheel supported grader frame hitched to so as to trail behind the tractor, an operator's station at the rear of the frame, a grader blade arranged under an intermediate part of the frame and mounted for vertical and angular adjustments, control mechanisms mounted on the frame substantially above the blade for effecting such adjustments, a set of control members extending from said mechanisms to said operator's station for manipulation by an operator at said station, and a second set of control members extending forwardly from the control mechanisms to a point within reach of a driver on the driver's support of the tractor, whereby the tractor driver may assist the said operator in manipulating and controlling the grader blade and whereby said driver may effect adjustments to the grader blade, without assistance, in the absence of the said grader operator.

5. In a machine of the character described, the combination with a tractor having a rearwardly disposed driver's support, a wheel supported grader frame hitched to so as to trail behind the tractor, an operator's station on the frame, a grader blade arranged under a part of the frame and mounted for vertical and angular adjustments, control mechanisms mounted on the frame for effecting such adjustments, a set of control members extending from said mechanisms to said operator's station for manipulation by an operator at said station, and a second set of control members extending forwardly from the control mechanisms to a point within reach of a driver on the driver's support of the tractor, whereby the tractor driver may assist the said operator in manipulating and controlling the grader blade and whereby said driver may effect adjustments to the grader blade, without assistance, in the absence of the said grader operator.

6. In a machine of the character described, the combination with a tractor having a rearwardly disposed driver's support, a grading machine having a frame pivotally hitched to so as to rail behind the tractor, an operator's station carried by the frame, a grader blade carried under the frame and mounted for vertical and angular adjustment, a set of control mechanisms having hand members disposed within reach of an operator at said station on the frame, for effecting said adjustments to the grader blade, and a second set of control mechanisms having hand members disposed within reach of the tractor operator on said driver's support.

7. A road grader for attachment to a tractor comprising a wheel supported frame, means for pivotally attaching the frame to the tractor so that it will trail therebehind as the tractor moves forwardly, a grader blade mounted under the frame for vertical and angular adjustments with respect thereto, adjuster devices connecting the blade and frame to effect said adjustments, an operator's station carried by a rear part of the frame, a set of manually operative control members disposed adjacent to the operator's station and connected with said adjuster devices whereby an operator at said station may regulate the position of the grader blade, and a second set of manually operative control members connected with said adjuster devices but disposed adjacent the front end of the frame and within reach of a driver on the tractor whereby said tractor operator may effect adjustments to the grader blade in the absence of the grader operator.

8. A road grader for attachment to a tractor comprising a frame, front and rear supporting wheels for the frame, a coupling device extending from the grader for pivotal attachment to the tractor whereby the grader will be connected for trailing engagement behind the tractor, a grader blade mounted under the frame for vertical and angular adjustments with respect thereto, adjuster devices connecting the blade and frame to effect said adjustments, an operator's station carried by a rear part of the frame, a set of manually operative control members disposed adjacent to the operator's station and connected with said adjuster devices whereby an operator at said station may regulate the position of the grader blade, and a second set of manually operative control members connected with said adjuster devices but disposed adjacent the front end of the frame and within reach of a driver on the tractor whereby said tractor operator may effect adjustments to the grader blade in the absence of the grader operator.

Signed at Stillwater, in the county of Washington, and State of Minnesota, this 11th day of July 1929.

JOSEPH L. BECKER.